United States Patent
Yang (10) Patent No.: US 11,301,208 B2
(45) Date of Patent: Apr. 12, 2022

(54) CONTROL METHOD, CONTROL DEVICE, AND CONTROL SYSTEM

(71) Applicant: Lenovo (Beijing) Co., Ltd., Beijing (CN)

(72) Inventor: Weidong Yang, Beijing (CN)

(73) Assignee: LENOVO (BEIJING) CO., LTD., Beijing (CN)

( * ) Notice: Subject to any disclaimer, the term of this patent is extended or adjusted under 35 U.S.C. 154(b) by 177 days.

(21) Appl. No.: 16/237,370

(22) Filed: Dec. 31, 2018

(65) Prior Publication Data

US 2019/0205091 A1 Jul. 4, 2019

(30) Foreign Application Priority Data

Jan. 2, 2018 (CN) .......................... 201810001117.X (51) Int. Cl.
| | | |
|---|---|---|
| *G06F 3/16* | (2006.01) | |
| *G10L 15/22* | (2006.01) | |
| *H04R 3/04* | (2006.01) | |
| *H04R 3/00* | (2006.01) | |
| *H04R 27/00* | (2006.01) | |

(52) U.S. Cl.
CPC .............. *G06F 3/167* (2013.01); *G10L 15/22* (2013.01); *H04R 3/00* (2013.01); *H04R 3/04* (2013.01); *G10L 2015/223* (2013.01); *H04R 27/00* (2013.01); *H04R 2227/003* (2013.01); *H04R 2227/005* (2013.01); *H04R 2430/01* (2013.01)

(58) Field of Classification Search
CPC ......... G10L 21/00; G10L 15/00; G10L 15/22; G06F 3/167

USPC .............................. 704/275, 272, 273, 500, 9
See application file for complete search history.

(56) References Cited

U.S. PATENT DOCUMENTS

| | | | | |
|---|---|---|---|---|
| 2006/0285651 | A1* | 12/2006 | Tice | ..................... H04L 12/2818 |
| | | | | 379/38 |
| 2007/0219805 | A1* | 9/2007 | Nomura | ................... G10L 15/22 |
| | | | | 704/275 |
| 2011/0055256 | A1* | 3/2011 | Phillips | .................... G10L 15/30 |
| | | | | 707/769 |
| 2014/0142934 | A1* | 5/2014 | Kim | ......................... G10L 15/20 |
| | | | | 704/226 |
| 2014/0313862 | A1* | 10/2014 | Rahimi | .................... H04W 4/02 |
| | | | | 367/199 |
| 2015/0302863 | A1* | 10/2015 | Dacosta | ................... H04N 7/15 |
| | | | | 348/14.08 |
| 2017/0133011 | A1* | 5/2017 | Chen | ........................ G10L 15/32 |

(Continued)

FOREIGN PATENT DOCUMENTS

| | | |
|---|---|---|
| CN | 105511287 A | 4/2016 |
| CN | 106328137 A | 1/2017 |

(Continued)

*Primary Examiner* — Michael Colucci
(74) *Attorney, Agent, or Firm* — Anova Law Group, PLLC (57) ABSTRACT

The present disclosure discloses a control method, including: acquiring an adjustment instruction, acquiring a target device, and processing the adjustment instruction such that the target device responds to the adjustment instruction. The adjustment instruction is determined according to a first sound information and the target device is determined based on information that characterizes an ambient sound. A control device and a control system are also provided.

15 Claims, 6 Drawing Sheets

(56) References Cited

U.S. PATENT DOCUMENTS

2018/0033448 A1* 2/2018 Matsuo ............... G10L 21/0232
2018/0158460 A1* 6/2018 Lee ....................... H05B 47/12

FOREIGN PATENT DOCUMENTS

| CN | 106356073 A | 1/2017 |
| CN | 107040638 A | 8/2017 |

* cited by examiner

CONTROL METHOD, CONTROL DEVICE, AND CONTROL SYSTEM

CROSS-REFERENCES TO RELATED APPLICATIONS

The present application claims priority of Chinese Patent Application No. 201810001117.X, filed on Jan. 2, 2018, the entire contents of which are hereby incorporated by reference.

FIELD OF THE DISCLOSURE

The present disclosure generally relates to the field of automatic control technology and, more particularly, relates to a control method, a control device, and a control system.

BACKGROUND

Nowadays, smart devices have been widely used. For example, in a smart home, smart speakers, smart TVs, smart lights, and other smart devices may be used.

Currently, smart devices can be automatically controlled by user's voice commands. For example, after a user sends a voice command related to a smart device to a remote controller, the remote controller needs to recognize the voice command to determine which smart device that the voice command is related to. For example, if the voice command given by the user to the remote controller is to "turn down TV voice volume in the living room", the remote controller determines that the control target is a TV in the living room based on the voice command and thus control the voice volume of the TV in the living room.

As such, when issuing a voice command to the remote controller, the user needs to describe the attributes of the smart device that needs to be controlled. Such a description needs to be error-free to prevent the remote controller from acting on an inaccurate command. If the user describes the attribute of the smart device inaccurately or the remote controller inaccurately recognizes the voice command, the control of the smart device will fail. Thus, the accuracy of automatic control of the smart devices needs to be improved.

The present disclosure provides methods, devices and systems directed to solve one or more problems set forth above and other problems.

BRIEF SUMMARY OF THE DISCLOSURE

One aspect of the present disclosure provides a control method, including: acquiring an adjustment instruction, determined according to a first sound information; acquiring a target device, determined according to information that represents an ambient sound; and processing the adjustment instruction, such that the target device responds to the adjustment instruction.

Another aspect of the present disclosure provides a control device, including: a processor and a memory for storing computer programs. The processor executes a computer program to acquire an adjustment instruction, acquire a target device, and process the adjustment instruction so that the target device responds to the adjustment instruction. The adjustment instruction is determined according to the first sound information; and the target device is determined by the information that characterizes an ambient sound.

Another aspect of the present disclosure provides a control system, including: a capture device for capturing a first sound information; multiple controlled devices; and a processing device configured to determine an adjustment instruction based on the first sound information, and determine a target device among the multiple controlled devices, such that the target device responds to the adjustment instruction.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Embodiments of present disclosure will be described in reference to the accompanying drawings. It should be understood, however, that these descriptions are only examples, rather than limiting the scope of this disclosure. Well-known and/or repetitive functions and structures are not descripted in detail to avoid unnecessary or superfluous details that would obscure the disclosure.

Various embodiments of the present disclosure provide a control method, a control device and a control system to facilitate automatic control.

Figure 1:
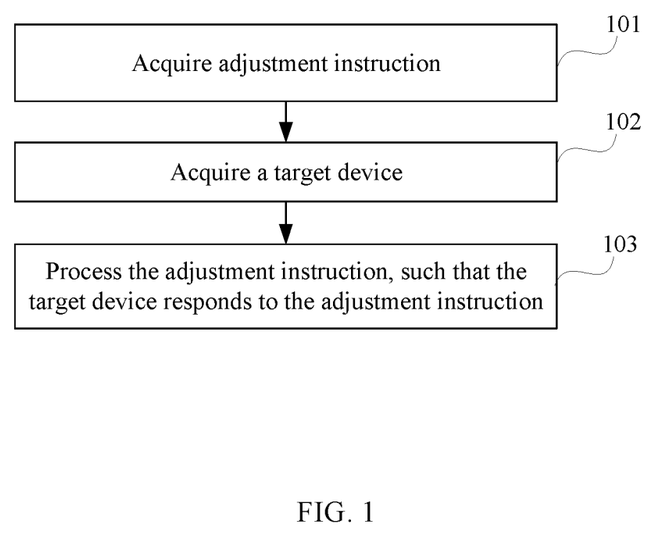
FIG. 1 illustrates schematic flowchart of a control method according to some embodiments of the present disclosure.

FIG. 1 illustrates schematic flowchart of a control method according to some embodiments of the present disclosure.

In 101 of FIG. 1: Acquiring an adjustment instruction. The adjustment instruction is determined according to first sound information.

In 102: Acquiring a target device. The target device is determined according to information that characterizes the ambient sound.

The first sound information can be voice information inputted by a user, while the information that characterizes the ambient sound not is inputted by the user.

The control method disclosed in the present disclosure can apply to a control device. When the user needs to control a device by the way of voice, a voice command can be issued. The first sound information can be the sound information corresponding to the voice command of the user, that is, the voice information inputted by the user. Based on the first sound information, an adjustment instruction corresponding to the voice command can be determined. For example, the first sound information is to "turn down the volume" inputted by the user, and then the adjustment instruction is an instruction for turning down the volume.

The control device in the present disclosure can be any suitable devices used in smart home systems. For example, the control device can be a terminal device with an audio capture apparatus, including smart speaker, smartphone, etc. The terminal device with the audio capture apparatus can be used as the first capture device to capture the first sound information.

In another example, the control device can be a central control device or a network node device including a router, a gateway, etc. In still another example, the control device can be a server, such as a backend server for providing services, or a backend server for voice recognition. In still another example, the control device can be a controlled device, such as a smart TV.

The control method disclosed in the present disclosure can be implemented by any of the disclosed control devices, although different devices can be used for capturing, sending, and processing information, as described in the following.

Referring back to FIG. 1, in some embodiments, acquiring adjustment instruction in 101 can refer to generation of the adjustment instruction by the control device, based on the first sound information captured by the control device itself. In this example, the control device can be the first capture device to capture the first sound information.

In other embodiments, the control device and the first capture device can be different devices. Acquiring adjustment instruction in FIG. 1 can refer to generation of the adjustment instruction by the control device, based on the first sound information sent from the first capture device.

In still other embodiments, acquiring adjustment instruction in FIG. 1 can refer to directly receiving the adjustment instruction generated by the first capture device, based on the first sound information captured by the first capture device.

In still other embodiments, acquiring adjustment instruction in FIG. 1 can be implemented as follows. The first capture device sends the first sound information to a voice analysis device. The voice analysis device can be, for example, a network voice recognition server. The voice analysis device analyzes the first sound information to generate the first analysis result which is sent to the control device. The control device can locally match the adjustment instruction. Alternatively, the voice analysis device analyzes the first sound information, generates the first analysis result, then directly generates the adjustment instruction matching with the first analysis result, and sends the adjustment instruction to the control device. The control device receives the adjustment instruction from the first capture device.

Similarly, it is understandable that the acquisition of the target device in 102 can refer to the control device determining a target device by itself or refer to the control device receiving information of the target device from other devices. For example, the control device itself can analyze attribute of the ambient sound information to determine the target device, or the control device receives a second analysis result of sound attribute sent by other devices to determine the target device. The present disclosure is not limited to whether the control device generates by itself or receives the adjustment instructions sent by other devices, and/or what types of the control device, and/or what types of the target devices, and whether the control device has the appropriate functionality.

In 103: Processing the adjustment instruction so that the target device responds to the adjustment instruction.

In one embodiment, processing the adjustment instruction can be performed in at least two ways: in one way, the control device includes the target device, in which processing the adjustment instruction can refer to responding to the adjustment instruction; in another way, the control device is not a target device, in which processing the adjustment instruction can refer to sending the adjustment instruction to the target device to enable the target device to respond to the adjustment instruction.

Since the adjustment instruction is determined based on the first sound information inputted by the user, the adjustment instruction corresponds to the first sound information. For example, the sound information in the first sound information that contains the "turn down volume" information, then the adjustment instruction can be an instruction for turning down the volume.

The target device in the present disclosure is determined based on information that distinguishes the information of the attribute of ambient sound from the first sound information used for determining the adjustment instruction. The first sound information can be regarded as the voice information that the user uses to issue a voice command. The target device can be determined by the information that characterizes the ambient sound based on the first sound information issued by the user, that simplifies the complexity of the input voice command and realize the automatic control without the need to describe the target device.

In some embodiments, information that characterizes the ambient sound can be sound information for the attribute of ambient sound, or non-sound information that characterizes the ambient sound.

Some embodiments of the present disclosure describe that non-sound information can also be used as the attribute of ambient sound.

Control devices or other devices that differ from the control devices can acquire the current state of all controlled devices within the control area, and analyze the current state of the controlled device to generate a third analysis result (as distinguished from the first analysis and the second analysis, as described above). If the third analysis result is generated by other devices other than the control device, the third analysis result is sent to the control device, and the target device is determined by the control device based on the third analysis result. If the third analysis result is self-generated by the control device, the target device is determined directly based on the third analysis result The control area refers to the control area of the control device, such as a home environment, devices connected to a local area network is in the control area of the control device.

The third analysis result includes non-sound information that characterizes the ambient sound. For example, the third analysis is used to characterize the playback device in the playing state within the control area, and the third analysis result is "TV A is currently in playing state". "TV A is currently in playing state" can characterize the ambient sound, that TV A is currently in a playing state that makes the ambient sound. The control device or other devices other than the control device is able to analyze the current state of all controlled devices within the control area to determine which controlled devices are in working state and which controlled devices in the working state are the playing device. It should be noted that playback device refers to devices capable of playing back sound on its own, such as television sets, speakers etc.

In another example, the third analysis results are used to characterize a tagging device that produces an ambient sound within the control area, as the third analysis result is "Washing machine B is in the working state and Washing machine B is a tagging device." The control device or other device different from the control device is able to analyze the current state of all controlled devices within the control area to determine which devices are in the working state, and which device in the work device is a tagging device. It should be noted that the tagging device refers to devices not able to playback sound on its own, but can generates sound can be used as an ambient sound to be tagged as tagging devices, such as a washing machine that produces a secondary sound when it washes clothes, and a vacuum cleaner produces a secondary sound when working.

The third analysis result can be used to characterize the tagging device and the playback device that generating the ambient sound within the control area.

It should be noted that when the third analysis results include multiple controlled devices, the target device can be determined based on the working state parameters of the multiple controlled devices. For example, the target device is the device has the working state parameter characterized by producing the loudest sound in working environment among multiple controlled devices.

In other words, the working state parameters of the controlled device can be further acquired by the control device or other devices. The working state parameters can characterize the parameters of the ambient sound, such as the sound volume of the television, the gear position of the washing machine, etc. The target device can be determined by analyzing the working state parameters.

When the third analysis only includes a controlled device, then it is possible to determine that the target device is the device to be controlled. If only one controlled device in the control area produces sound, then the current ambient sound is the sound produced by the controlled device, and information that characterizes the ambient sound can indicate the controlled device generating sound. For example, the attribute of the ambient sound can indicate TV A is playing. Apparently, information that TV A is playing can also characterize the sounds in the current environment. The controlled device can be determined as the target device by the information that characterizes the ambient sound alone because there is only one controlled device that produces sound in the current environment.

As can be seen above, the controlled device in the present disclosure can be a playback device or a non-playback device.

In some embodiments, processing the adjustment instruction so that the target device responds to the adjustment instruction can includes: processing the adjustment instruction so that the target device switch from a first working state to a second working state, in which the ambient sound produced by the target device in the first working state is louder than that of the target device in the second working state If the target device is a playback device, the volume of the target device can be muted or adjusted based on the adjustment instruction, or the target device is shut down directly. And if the target device is non-playback device, the target device's operating parameters can be adjusted based on the adjustment instruction, such as switching the target device from a high-level to a low-level operation state or shutting down the target device directly.

In some embodiments of the present disclosure, the information of the ambient sound is characterized as the sound information of the ambient sound, in which the characterized information of the ambient sound includes a second sound information of the characterized information of the ambient sound and the second sound information including sound information of the first sound information captured by the first capture device. The target device can be determined by the second sound information.

In an application scenario, only a non-playback device is in the working state in control area of the control device. The non-playback device can radiate a secondary sound as an ambient sound. The first capture device ca capture the second sound information in the secondary sound from the non-playing device.

The control device or other devices different from the control device can match the second sound information with various pre-stored secondary sounds produced by non-playback devices to determine the non-playback device that matches the second sound information as the target device. That is, the target device is a non-playback device that produces a secondary sound that matches the second sound information.

In this example, when the adjustment instruction is processed and the target device responds to the adjustment instruction, the adjustment instruction can be processed to make the target device to switch from a first working state to a second working state, in which the ambient sound generated by the target device in the first working state is louder than the ambient sound generated by the target device in the second working state.

In some embodiments, the information that characterizes the ambient sound can include a second sound information that characterizes the ambient sound and a third sound information that characterizes the ambient sound, in which a target device is determined by the second sound information that characterizes the ambient sound and the third sound information that characterizes the ambient sound. The second sound information comes from the first capture device which captures the first sound information. The first capture device not only captures the first sound information but also captures the second sound information, in which the first sound information including the user input sound information, the second sound information including non-user input sound information accompanied with the first sound information. The third sound information can be used to characterize the information generated by multiple controlled devices, in which sound information generated by each controlled device is treated as a part of the third sound information.

Some embodiments describe the second sound information and the first sound information.

In some embodiments for capturing the first sound information and the second sound information, the first sound information and the second sound information are the different sound information, separated from the sound information captured by the first capture device. The first sound information and the second sound information may be at least partially overlap.

For example, in the process of the first capture device for capturing the second sound information, the first capture device can also capture the first sound information when the user issued voice commands. The first capture device ca capture the first sound information for a predetermined period and stops acquisition of sound to generate to-be processed sound information. The to-be processed sound information includes the second sound information and the first sound information. During the acquisition of the second sound information, the first capture device also captures the first sound information so that the second sound information and the first sound information are at least partially overlap.

It is understandable that the first capture device can be the closest device to the user, so audio that causes auditory interference to the user can be captured by the first capture device, or the sound information of the strongest sound signal, except the sound generated by the first capture device itself, can be captured by the first capture device. Therefore, the sound information captured by the first capture device is best representative of the user's intention. The strongest sound information is the most recognizable and easily-separated sound information Control devices can process the to-be processed sound information, for example, analyzing the to-be processed sound information based on sound characteristic parameters (voiceprint parameters, sound amplitude, etc.) to separate the first sound information and the second voice information. It should be noted that the control device can be the first capture device itself, in which the first capture device, after capturing the to-be processed sound information, separates the first sound information and the second sound information from the to-be processed sound information directly. Control devices can be a device other than the first capture device, such as a central control device, in which the first capture device may send the to-be processed sound information to a control device to separate the first sound information and the second sound information from the to-be processed sound information. Or the first capture device processes sound information to separate the first sound information and the second sound information and sends the first sound information and the second sound information to the control device or collaboration between other devices. All these options are within the scope of the present disclosure.

Figure 2:
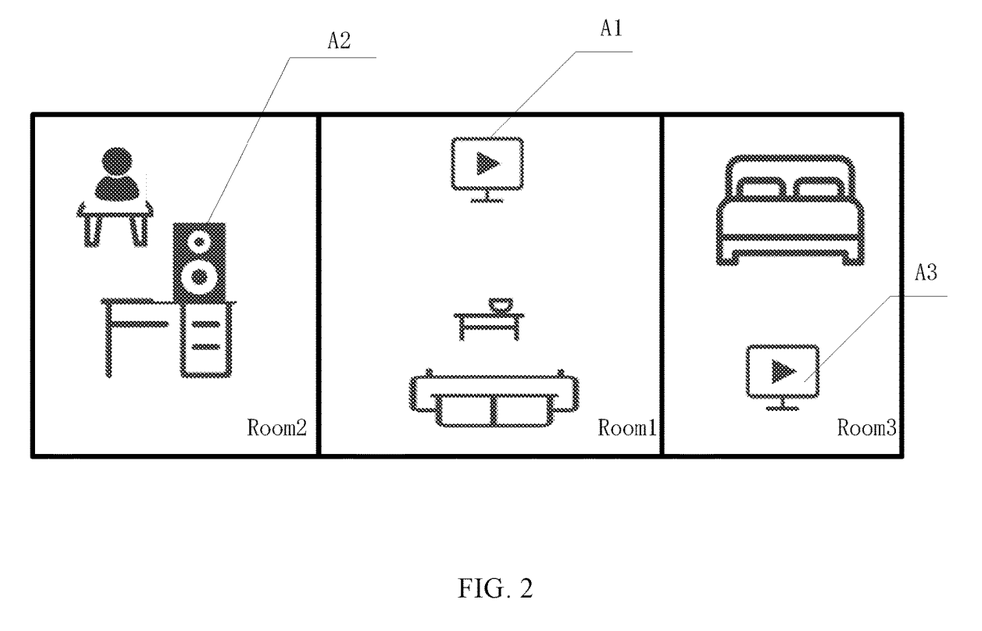
FIG. 2 illustrates an application scenario diagram for a control method according to some embodiments of the present disclosure.

FIG. 2 illustrates a specific application scenario to facilitate easy understanding. Assuming the current home environment includes at least a living room Room1, a study Room2 and a bedroom Room3, in which TV A1 in the living room Room1 is playing a program; TV A3 in the bedroom Room3 is playing a program, a speaker A2 in the study Room2 serves as a first capture device.

Speaker A2 captures a second sound information (including TV A1 output of sound information and TV A3 output of sound information) in the current environment. When the user in the study Room2 speaks a first voice, the speaker A2 ca capture the first voice from the user input. The speaker A2 captures the to-be processed sound information including the first sound information from the user, a sound from TV A1, and a sound from TV A3. If the sound from TV A3 is louder than that from TV A1, the second sound information captured by the speakers in the study Room2 has the signal intensity of TV A3 in the bedroom Room3 is far greater than the signal intensity of TV A1 in the living room Room2, so that the sound information from TV A3 is easier to separate. Processing the to-be processed sound information can separate the first sound information and the second sound information included in the sound of TV A3. The first sound information is used to determine the adjustment instruction, and the second sound information is used to determine the target device that responds to the adjustment instruction.

Suppose TV A3 is outputting the sound information as "according to the report just received by this station", while TV A1 is outputting sound information for music, the user sends a voice for "lower the volume." The first capture device captures the to-be processed sound information can include "according to the report just received by this station" by TV A3, music by TV A1 and "lower the volume" by the use. These sounds may have partial overlap. Processing the to-be processed sound information can separate the second sound information "according to the report just received by this station" and the first sound information "lower the volume." Matching the second sound information "according to the report just received by this station" separated from the first capture device, with the sound information of "according to the report just received by this station" from TV A3, and the sound information of music from TV A1, can determine that the third sound information from TV A3 and the second sound information from the first capture device match successfully, so that TV A3 is determined as the target device.

Figure 3:
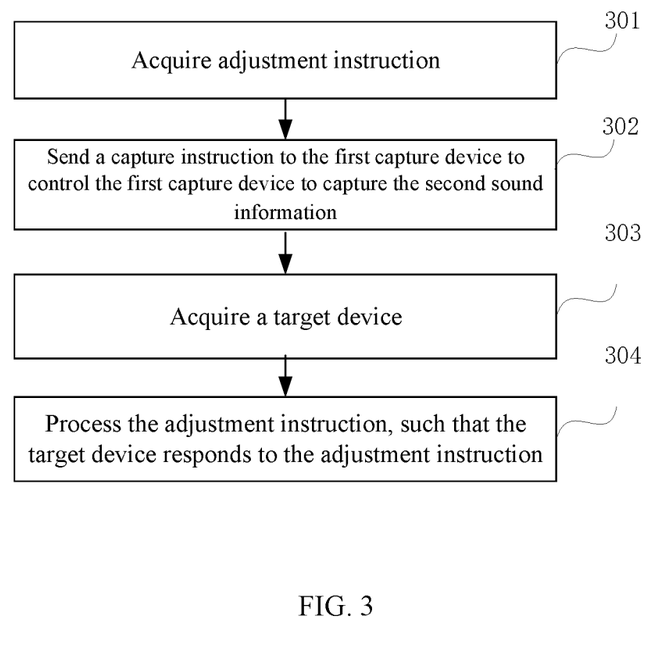
FIG. 3 illustrates a schematic flowchart of a control method according to some embodiments of the present disclosure.

As another method of capturing the first sound information and the second sound information, some embodiments describe a control method, as shown in FIG. 3, which includes the following:

In 301: acquiring an adjustment instruction. The adjustment instruction is determined according to the first sound information.

In 302: sending a capture instruction to the first capture device to control the first capture device to capture the second sound information.

The capture instruction is generated based on the adjustment instruction. The control device determines which controlled device to be adjusted after acquiring the adjustment instruction. A capture instruction is sent to the first capture device to control the first capture device to capture the second sound information to determine which one of the controlled devices is adjusted.

In some embodiments, the control device and the first capture device can be different devices. The control device sends the capture instruction to the first capture device after receiving the adjustment instruction, and the first capture device captures the second sound information after receiving the capture instruction.

The adjustment instruction can be the instruction determined by the control device based on the first sound information sent by the first capture device, or the adjustment instruction can be determined by the first sound information after capturing the first sound information and then the adjustment instruction is sent to the control device.

Since the second sound information is the information captured by the first capture device based on the capture instruction, the first sound information and the second sound information are the sound information captured by the first capture device at different times. The first capture device captures the first sound information when receiving instructions, and then captures the second sound information.

In 303: acquiring the target device.

The target device is determined by information that characterizes the ambient sound, which includes the second sound information that characterizes the ambient sound and the third sound information that characterizes the ambient sound. Matching the second sound information that characterizes the ambient sound with the third sound information that characterizes the ambient sound to determine that the third sound information has a higher degree of match than a predetermined degree of match to determine a controlled device that produces the higher degree of match as the target device.

In FIG. 2, for example, the user sends a voice of "turn down the volume", the speaker A2 ca capture the first sound information that contains the "turn down the volume" to determine the adjustment instruction based on the first sound information. The adjustment instruction is sent to the control device. The control device generates a capture instruction based on the adjustment instruction and sends the capture instruction to the speaker A2. The speaker A2 receives the capture instruction, and continues to capture sound information of the current environment. If TV A3 is playing "there is an accident in the city center," and TV A1 is playing music, then the second sound information captured contains "there is an accident in the city center" and the music. Because the signal intensity of TV A3 is higher than that of TV A1 in the second sound information captured by the speaker A2, matching the second sound information from the speaker A2 with the third sound information from TV A3, and matching the second sound information from the speaker A2 with the third sound information from TV A1 can determine that the second sound information from the speaker A2 and the third sound information from TV A3 match successfully, so as to determine TV A3 as the target device.

In 304: processing the adjustment instruction so that the target device responds to the adjustment instruction.

The target device in the present disclosure is determined based on information that distinguishes attribute of the ambient sound from the first sound information used for determining the adjustment instruction, in which the first sound information can be regarded as the sound information that the user uses to issue a voice command. The target device can be determined by the information that characterizes the ambient sound based on the first sound information issued by the user. Therefore, the complexity of the input voice command can be simplified to realize the automatic control without the need to describe the target device.

In some embodiments, the third sound information is the information captured by a second capture device, and the second capture device can be the same device as or a different device from the target device.

In one case, the controlled device ca capture the sound information generated by itself, that is, the controlled device as a second capture device. The second capture device and the target device are the same device when the controlled device is determined to be the target device that needs to respond to the adjustment instruction.

In the other case, the second capture device, different from the controlled device, captures sound information of the controlled device. The target device and the second capture device are different devices.

In some embodiments of the present disclosure, the target device is determined based on the second sound information that characterizes the ambient sound and the third sound information that characterizes the ambient sound. The second sound information is captured by the first capture device that captures the first sound information. The third sound information is used to characterize the information produced by multiple controlled devices. The third sound information includes the third sound information, generated by the multiple controlled devices, which can be information captured by a second capture device. The second capture device and the target device can be the same device or different devices.

Then, the target device can be determined based on the matching relationship between the second sound information and the third sound information, in which the controlled device that produces the third sound information having a matching degree higher than a predetermined matching degree, is determined as the target device.

In one example, the target device is a controlled device used to characterize the sound content that produces the third sound information matching the sound content of the second sound information. One-by-one matching the sound contents of the third sound information generated by the multiple controlled devices, with the sound content of the second sound information, can determine the sound content of third sound information of the multiple controlled devices, that matches the sound content of the second sound information, thus determining the target device.

For example, two sound contents of two pieces of sound information can be directly matched by voice. When the voiceprints of the two contents are determined to satisfy the predetermined matching degree, the sound contents of the two pieces of sound information are determined to be a match. Or the two sound contents of two pieces of sound information are transformed to text contents and the two text contents are determined to satisfy the predetermined matching degree, the sound contents of the two pieces of sound information are determined to be a match.

Alternatively, the target device is a controlled device used to characterize the generation time of the third sound information (at which the third sound information is generated) matching the generation time of the second sound information. One-by-one matching the generation time of the third sound information, generated by the multiple controlled devices, with the generation time of the second sound information can determine the generation time of the third sound information that matches the generation time of the second sound information, thus determining the target device.

In some embodiments of the present disclosure, an adjustment instruction based on the first sound information can be the instruction determined with attribute of the first sound information satisfying a predetermined condition. The attribute of the first sound information can refer to a distance that the first sound has travelled, and if the distance reaches a predetermined distance, the predetermined condition is satisfied; and if the distance does not reach the predetermined distance, the predetermined condition is not satisfied. Optionally, the predetermined condition can be a predetermined intensity of loudness. The adjustment instruction can be used to determine the intensity of loudness of the first sound information, and the predetermined condition is satisfied if the intensity of loudness is higher than the predetermined intensity of loudness. Or the predetermined condition can be a predetermined frequency, a predetermined sound volume, etc.

It is understood that the attribute of the first sound information inputted by the user that satisfies the predetermined condition, is intended to be used to control the controlled device. And the attribute of the first sound information that does not satisfy the predetermined condition can be used to characterize that the user input of the first sound information is to control a first capture device and not to automatically control a target device. In this case, even if the first sound information is captured by the first capture device, the first sound information does not satisfy the predetermined condition and therefore the adjustment instruction based on the first sound information will not be generated.

An example for an application scenario in the home environment: assuming a speaker in the study room and a television in the living room are playing sound; the user is in the study room and the speaker serves as a first capture device. If the user wants to control the TV the living room to lower the volume, he may say "lower the volume" loudly. If the user wants to control the speakers in the study room to lower the volume, he may say "lower the volume" using a lower voice. The speaker captures the first sound information including "lower the volume", then either the speaker or a control device analyzes the attributes of the first sound information to determine that the intensity of loudness of the first sound reaches a predetermined intensity of loudness, and generates a first adjustment instruction used to control the target device. If the attribute of the first sound information does not satisfy the predetermined condition, a second adjustment instruction is generated, which is used to control the first capture device itself.

In other words, some embodiments can simulate the user's real experience by using the first sound information input by the user, similar to the user in a dialogue with a "virtual user" of the controlled device in distance, by telling the "virtual user" how to control the controlled device. When the attribute of the first sound information of the user's input satisfies the predetermined condition, the first sound information is to control the controlled device remotely, not to control the first capture device nearby. The adjustment instruction determined based on the attribute of the first sound information satisfying the predetermined condition, is for controlling the target device.

In another example, the second adjustment instruction is determined in response to that the attribute of the first sound information does not satisfy the predetermined condition; and the second adjustment instruction is the adjustment instruction to control the second capture device itself.

For a control device, if the control device acquires the first adjustment instruction, the target device is determined based on the above example. If the control device acquires the second adjustment instruction, the first capture device is directly controlled (if the control device is the first capture device itself, then the first capture device is directly responsive to the second adjustment instruction). Or, when the first adjustment instruction is acquired, the target device is determined to be the device having the strongest signal of the second sound information, captured by the first capture device, excluding the sound generated by the first capture device itself. If the second adjustment instruction is captured, the target device can the device determined to have the strongest signal of the second sound information captured by the first capture device.

It is understandable that if the first capture device itself emits sound, the signal intensity, of the sound generated by the first capture device in the second sound information captured by the first capture device, is the strongest, The sound generated by the first capture device can be determined, so the second sound information can be determined as the strongest signal of the second sound information, captured by the first capture device, excluding the sound from the first capture device itself.

For a first capture device, the first capture device can have different modes of operation. When the mode of operation is a control mode, the first sound information is directly used to control the capture device, and there is no need to determine if the first sound information satisfies the predetermined condition and the second adjustment instruction can be determined directly based on the first sound information, so that the first capture device responds to the second adjustment instruction. When the mode of operation is a remote control mode, the first sound information is directly used to control the controlled device, and there is no need to determine if the first sound information satisfies the predetermined condition, and the control of the target device is in accordance with the description of the present disclosure. The users can also manually switch the mode of operation of the first capture device.

The first capture device can be in both the control mode and the remote control mode. Actual implementations can also refer to the above descriptions on using the first adjustment and second adjustment instructions.

The present disclosure does not limit the device used to determine whether the first sound information satisfies a predetermined condition. For a control device, the control device may be the first capture device or other devices than the first capture device, such as controlled devices, central control devices, etc. If the control device is the first capture device, adjustment instructions can be directly generated if the first sound information is determined to satisfy a predetermined condition. If the control device is not the first acquisition other device, then the control device can determine if the first sound information captured by the first capture device satisfying a predetermined condition to generate an adjustment instruction. Control devices can also receive the first sound information captured by the first capture device to determine if the first sound information captured satisfying a predetermined condition to generate an adjustment instruction. There are only a few examples provided here, and it is understood that the other possible ways are within the scope of the present disclosure.

As mentioned above, devices for acquisition, transfer and processing may the same or different devices, and a first capture device and a device are the at least two devices included. The above embodiments use four devices as examples in a control method, which include a first capture device, a controlled device, a central control device and a backend server.

Among them, the first capture device is for the acquisition of the first sound information and second sound information; the controlled device for the generation of the third sound information; the central control device is the core device for communicating with the first capture device, the second capture device, and the backbend server. The backend server can provide services for voice recognition. Other backend servers can also be used as long as the functionality of the present disclosure can be realized.

Figure 4:
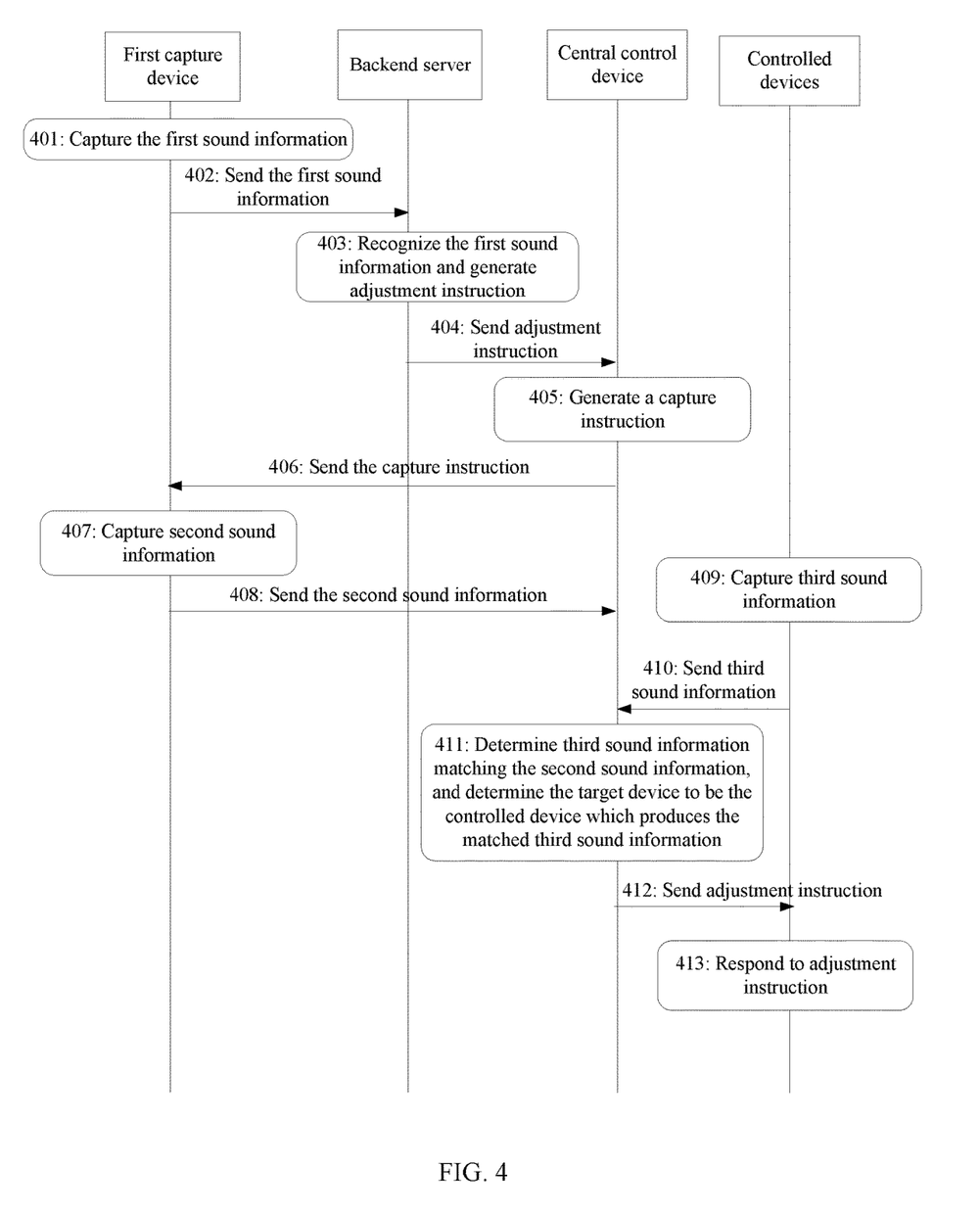
FIG. 4 illustrates a signaling flowchart of a control method according to some embodiments of the present disclosure.

Some embodiments of the present disclosure, as illustrated in FIG. 4, describe a control method including the following:

In 401: A first capture device capturing the first sound information.

In 402: The first capture device sending the first sound information to a backend server.

In 403: The backend server recognizing the first sound information, and generating an adjustment instruction based on the recognition result.

In 404: The backend server sending the adjustment instruction to a central control device.

In 405: The central control device generating a capture instruction based on the adjustment instruction.

In 406: The central control device sending the capture instruction to the first capture device.

In 407: The first capture device capturing second sound information based on the capture instruction.

In 408: The first capture device sending the second sound information to the central control device.

In 409: A plurality of controlled devices capturing third sound information.

In 410: Sending the third sound information captured by a plurality of controlled devices to a central control device.

In 411: The central control device determining the third sound information that matches the second sound information, and accordingly determining the target device to be the controlled device which produces the matched third sound information.

In 412: The central control device sending the adjustment instruction to the target device.

In 413: The target device responding to the adjustment instruction.

Figure 5:
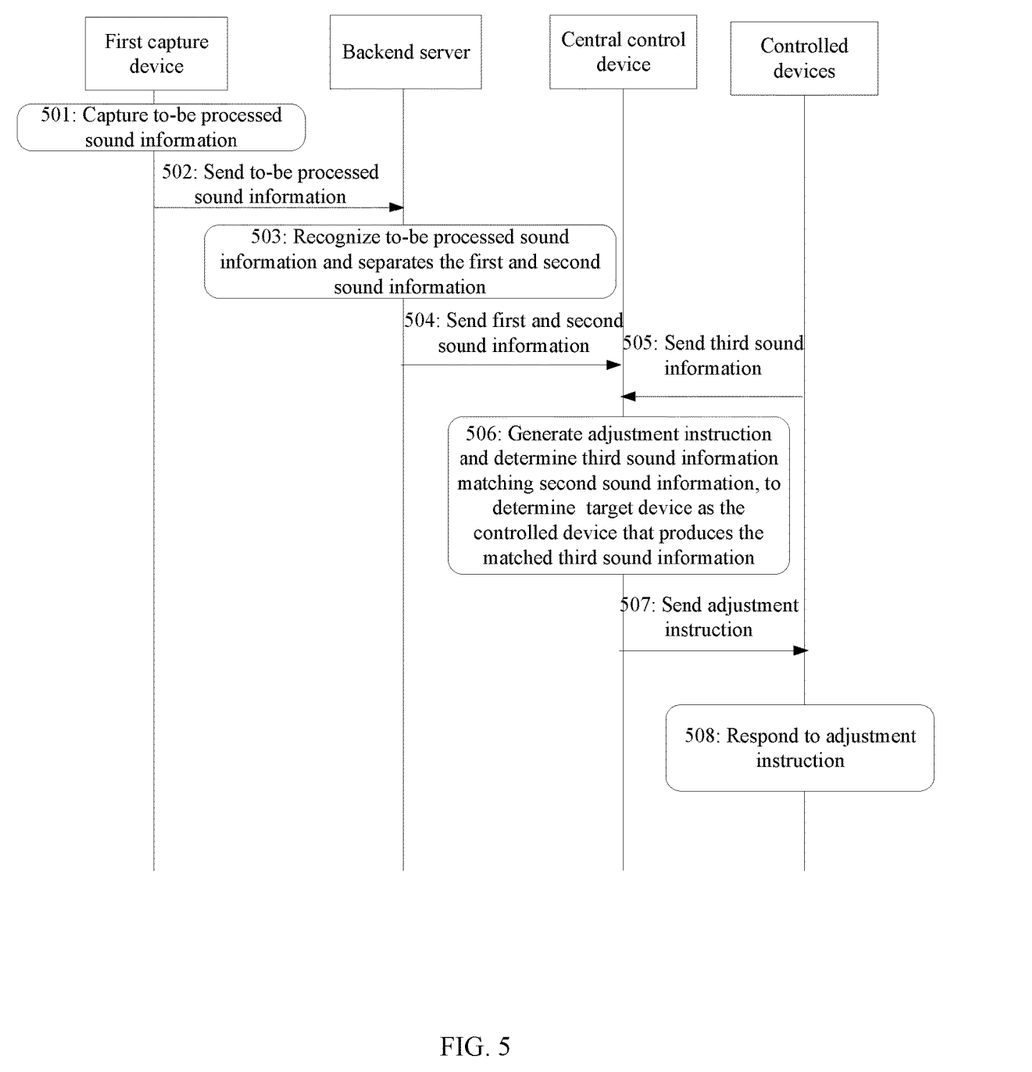
FIG. 5 illustrates a signaling flowchart of a control method according to some embodiments of the present disclosure.

Some embodiments, using the four devices above, describe a control method, as illustrated in FIG. 5, including the following:

In 501: A first capture device captures the to-be processed sound information.

In 502: The first capture device sends the to-be processed sound information to the backend server.

In 503: The backend server recognizes the to-be processed sound information and separates the first sound information and the second sound information.

In 504: The backend server sends the first sound information and the second sound information to the central control device.

In 505: A plurality of controlled devices transmit the third sound information to the central control device.

In 506: The central control device generates the adjustment instruction based on the first sound information and determines the third sound information that matches the second sound information, to determine the target device as the controlled device which produces the matched third sound information.

In 507: The control device sends the adjustment instruction to the target device.

In 508: The target device responds to the adjustment instruction.

The present disclosure describes a control method, using four cooperating devices. The central control device can serve as the core component of the control method as the control device. The present disclosure is not limited to the above two examples. The first capture device and the central control device can be the same device, or the first capture device, the central control device and the backend server can be the same device, or the central control device and the backend server can be the same device, or the central control device, the backend server and the controlled device can be the same device.

Figure 6:
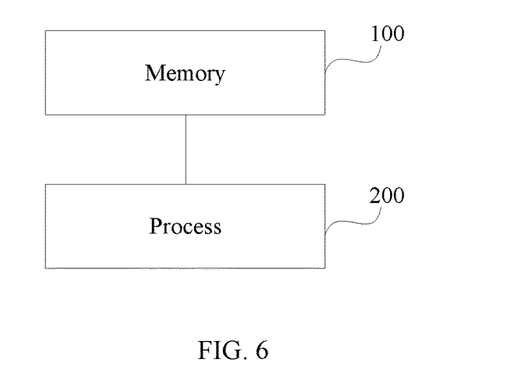
FIG. 6 illustrates a schematic structural diagram of a control device according to some embodiments of the present disclosure.

The disclosure also describes a control device, as shown in FIG. 6, which corresponds to a control method, including: a memory 100 and a processor 200. The memory 100 is used to store computer programs running at the processor 200. The processor 200 executes the computer program for receiving an adjustment instruction, acquiring a target device, and processing the adjustment instruction, so that the target device responds to the adjustment instruction. The adjustment instruction is determined according to the first sound information, and the target device is determined by information that characterizes the ambient sound.

For example, if the control device is a target device, the processor 200 processing adjustment instruction is for the control device directly to respond to the adjustment instruction; and if the control device is not a target device, the processor 200 processing adjustment instruction sends the adjustment instruction to the target device, so that the target device responds to the adjustment instruction.

The target device in the present embodiment is determined based on information that distinguishes the ambient sound from the first sound information used to determine the adjustment instruction, and that the first sound information can be regarded as the voice information that the user uses to issue a voice command. The target device can be determined by the information that characterizes the ambient sound, based on the first sound information issued by the user. So, the complexity of the input voice command can be simplified to realize the automatic control without the need to describe the target device.

In some embodiments of a control device of the present disclosure, information that characterizes the ambient sound can be a sound information for the characterization of ambient sounds, or non-sound information that characterizes an ambient sound.

In other embodiments of the control device of the present disclosure, information that characterizes the ambient sound may include a second sound information that characterizes the ambient sound and a third sound information that characterizes the ambient sound, in which the target device is determined by the second sound information that characterizes the ambient sound and the third sound information that characterize the ambient sound.

The second sound information comes from the first capture device which captures the first sound information, and the third sound information can be used to characterize the information produced by multiple controlled devices, that is, the sound information generated by each controlled device can be a part of the third sound information.

The first sound information and the second sound information can be different sound information separated from the to-be processed sound information captured by the first actuation device; in which the first sound information and the second sound information in the to-be processed sound information are at least partially overlapping.

In other embodiments for acquisition of the first sound information and the second sound information, the processor can be also used to send a capture instruction to the first capture device to control the first capture device to capture the second sound information; in which the capture instruction is generated based on the adjustment instruction.

Yet in some other embodiments of the control device, the third sound information is information captured by a second capture device, and the second capture device can be the same device as or a different device from the target device.

In one example, the controlled device ca capture the sound information produced by itself, in which the controlled device serves as a second capture device. The second capture device and the target device are the same device, in which the controlled device is determined to be the target device that needs to respond to the adjustment instruction.

In another example, the target device and the second capture device are different devices, in which the second capture device captures sound information of the controlled device.

Yet in another example of the control device of the present disclosure, the target device can be the controlled device having the sound content of the third sound information matching the sound content of the second sound information; or the target device can be the controlled device having the generation time of the third sound information matching the generation time of the second sound information In one example of the control device of the present disclosure, the adjustment instruction is determined if an attribute of the first sound information satisfies a first attribute.

Figure 7:
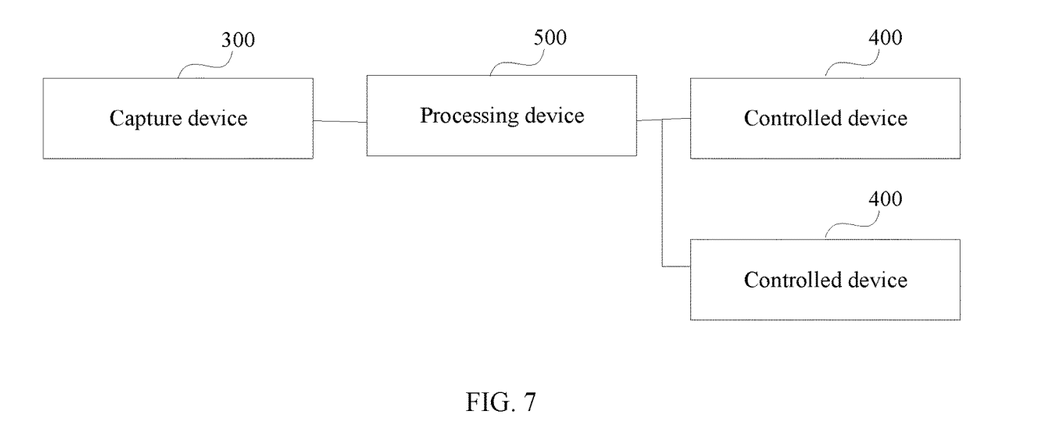
FIG. 7 illustrates a schematic structural diagram of a control system according to some embodiments of the present disclosure.

The present disclosure also describes a control system, as shown in FIG. 7, including a capture device 300, at least one controlled device 400 and a processing device 500.

For example, the capture device 300 is used to capture the first sound information and to send the first sound information to the processing device 500.

The processing device 500 determines an adjustment instruction based on the first sound information and determines a target device in a controlled device based on information that characterizes the ambient sound and sends the adjustment instruction to the target device to enable the target device to respond to the adjustment instruction.

Optional, the adjustment instruction can be an instruction that is determined when the first sound information satisfies a predetermined condition, and the processing device 500 determines the adjustment instruction based on the first sound information when the first sound information satisfies the predetermined condition.

Thus, the target device in the present disclosure is determined based on information that distinguishes the ambient sound from the first sound information used to determine the adjustment instruction, in which the first sound information can be regarded as the voice information that the user uses to issue a voice command. The target device can be determined by the information that characterizes the ambient sound based on the first sound information issued by the user. So, the complexity of the input voice command can be simplified to realize the automatic control without the need to describe the target device.

In some embodiments of the control system of the present disclosure, information that characterizes the ambient sound can be a sound information for the characterization of the ambient sound, or non-sound information that characterizes the ambient sound. The non-sound information that characterizes the ambient can be sent to a processing device from a controlled device. The non-sound information can also be determined by a processing device that communicates with a controlled device.

In other embodiments of the control system of the present, information that characterizes the ambient sound may include a second sound information that characterizes the ambient sound and a third sound information that characterizes the ambient sound.

The second sound information is the information captured by the capture device. In one example, the first sound information and the second sound information are different sound information, separated from the to-be processed sound information captured by the first capture device, in which the first sound information and the second sound information in the to-be processed sound information are at least partially overlapping.

The capture device captures the to-be processed sound information and separates the first sound information and the second sound information from the to-be processed sound information, and sends the first sound information and the second sound information to the processing device. Or the capture device captures the to-be processed sound information and sends the to-be processed sound information to the processing device to separate the first sound information and the second sound information from the to-be processed sound information.

In another example, the processing device generates a capture instruction based on an adjustment instruction and sends the capture instruction to the first capture device; and the first capture device captures a second sound information based on the capture instruction and sends the second sound information to the processing device.

In another example of the control system of the present disclosure, the controlled device can send the third sound information that characterizes the ambient sound directly to the processing device. The control system may also include a second capture device, which captures the third sound information produced by the controlled device and sends the third sound information to the processing device.

Yet in some other embodiments of the control system of the present disclosure, the target device is the controlled device having a sound content used to characterize the third sound information matching a sound content of the second sound information. Or the target device is a device having a generation time of the third sound information matching a generation time of the second sound information.

For example, the processing device can match the received sound content of the second sound information and the received sound content of the third sound information, to determine if the sound content of the third sound information that matches the sound content of the second sound information, and then to determine the target device of the controlled device having the matching third sound information.

The processing device can match the received generation time of the second sound information and the received generation time of the third sound information, to determine if the generation time of the third sound information that matches the generation time of the second sound information, and then to determine the target device of the controlled device having the matching third sound information.

In some embodiments of the control device of the present disclosure, an adjustment instruction is determined when an attribute of the first sound information satisfies a first attribute It should be noted that the present disclosure describes simple implementations of the control device and the control system. Detailed description can be referred to the embodiments of control methods.

Each embodiment of the present disclosure is described in a recursive manner, and the description of each embodiment focuses on difference from other embodiment with the similar descriptions being referred among embodiments. Relatively simple descriptions are used for embodiments of device and system. Detailed description can be referred to the embodiments of control methods.

Compared with the existing technologies, the embodiments of the present disclosure provide a control method, including: acquiring an adjustment instruction, in which the adjustment instruction is determined by a first sound information; acquiring a target device, in which the target device is determined by information that characterizes an ambient sound; and processing the adjustment instruction, so that the target device responds to the adjustment instruction. It can be seen that the target device in the present disclosure is determined based on information of the ambient sound that distinguishes from the first sound information associated with the adjustment instruction. The first sound information can be regarded as the sound information used by the user to issue a voice command. The target device can be determined by the information that characterizes the ambient sound associated with the voice command, therefore, the complexity of the user's input of voice commands can be simplified for automatically control without the need to describe the target device.

The above embodiments are merely exemplary embodiments of the present disclosure and are not intended to limit the scope of the present disclosure. The scope of the present disclosure is defined by the claims. Those skilled in the art can make various modifications or equivalent replacements to the present disclosure within the spirit and scope of the present disclosure, and such modifications or equivalent replacements should also be regarded as falling within the protection scope of the present disclosure.

What is claimed is:

1. A control method, comprising:
   acquiring an adjustment instruction at a first capture device, wherein the adjustment instruction is determined according to first sound information;
   acquiring a target device, wherein the target device is determined by information that characterizes an ambient sound characterized by a second sound information captured by the first capture device to determine the target device, wherein a second generation time of the second sound information at least partially overlaps a first generation time of the first sound information; and
   processing the adjustment instruction, such that the target device responds to the adjustment instruction,
   wherein the second sound information is non-linguistic and includes amplitude information of the second sound.

2. The method according to claim 1, further comprising:
   sending capture instruction to the first capture device to control the first capture device to acquire the second sound information, wherein the capture instruction is generated based on the adjustment instruction.

3. The method according to claim 1, wherein the information that characterizes the ambient sound to determine the target device further includes third sound information that characterizes the ambient sound.

4. The method according to claim 3, wherein the third sound information characterizes information produced by a plurality of controlled devices.

5. The method according to claim 3, wherein the third sound information is acquired by a second capture device, and wherein the second capture device is a same device as the target device.

6. The method according to claim 3, wherein the third sound information is acquired by a second capture device, different than the target device.

7. The method according to claim 3, wherein:
   the target device is a controlled device used to match a sound content of the third sound information with a sound content of the second sound information.

8. The method according to claim 3, wherein:
   the target device is a controlled device used to match a generation time of the third sound information with a generation time of the second sound information.

9. The method according to claim 1, wherein:
   the adjustment instruction is determined in response to that an attribute of the first sound information satisfies a predetermined condition,
   the attribute includes one or more of an intensity of a loudness of the first sound information and a frequency of the first sound information, and
   the predetermined condition includes one or more of a predetermined intensity of the loudness and a predetermined frequency.

10. A control device, comprising:
    a processor; and
    a memory configured to store computer program instructions, wherein the processor executes the computer program instructions to:
    acquire an adjustment instruction at a first capture device, acquire a target device, and process the adjustment instruction, such that the target device responds to the adjustment instruction wherein:
    the adjustment instruction is determined according to first sound information, and
    the target device is determined by information that characterizes an ambient sound characterized by a second sound information captured by the first capture device to determine the target device, wherein a second generation time of the second sound information at least partially overlaps a first generation time of the first sound information, and the second sound information is non-linguistic and includes amplitude information of the second sound.

11. The device according to claim 10, wherein the processor is further configured to:
    send a capture instruction to the first capture device to control the first capture device to acquire the second sound information, wherein the capture instruction is generated based on the adjustment instruction.

12. The device according to claim 10, wherein:
    the third sound information characterizes information produced by a plurality of controlled devices,
    the third sound information is acquired by a second capture device or a target device.

13. A control system, comprising:
    a first capture device for capturing first sound information;
    a plurality of controlled devices; and
    a processing device configured to determine an adjustment instruction based on the first sound information and determine a target device in the plurality of controlled devices, such that the target device responds to the adjustment instruction,
    wherein the target device is determined by information that characterizes an ambient sound characterized by a second sound information captured by the first capture device, wherein a second generation time of the second sound information at least partially overlaps a first generation time of the first sound information, and the second sound information is non-linguistic and includes amplitude information of the second sound.

14. The system according to claim 13, wherein the processor is further configured to:
    send a capture instruction to the first capture device to control the first capture device to acquire the second sound information, wherein the capture instruction is generated based on the adjustment instruction.

15. The system according to claim 13, wherein:
    the third sound information characterizes information produced by a plurality of controlled devices, the third sound information is acquired by a second capture device or a target device.

* * * * *